United States Patent
O'Neil et al.

(10) Patent No.: US 7,720,040 B2
(45) Date of Patent: May 18, 2010

(54) SEAMLESS WIRELESS MOBILITY

(75) Inventors: Douglas O'Neil, Marietta, GA (US);
John Alson Hicks, III, Roswell, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 12/538,465

(22) Filed: Aug. 10, 2009

(65) Prior Publication Data
US 2009/0296676 A1    Dec. 3, 2009

Related U.S. Application Data

(63) Continuation of application No. 11/275,783, filed on Jan. 27, 2006, now Pat. No. 7,574,207.

(51) Int. Cl.
*H04W 60/00*    (2009.01)
(52) U.S. Cl. ............... 370/338; 455/435.1; 455/466; 455/458
(58) Field of Classification Search ............ 370/338; 455/435.1, 466, 458, 41.2, 432.1
See application file for complete search history.

(56) References Cited

U.S. PATENT DOCUMENTS

| 6,233,465 | B1 | 5/2001 | Smith et al. |
| 7,292,870 | B2 * | 11/2007 | Heredia et al. ............ 455/466 |
| 2003/0104827 | A1 * | 6/2003 | Moran et al. ............ 455/466 |
| 2005/0120198 | A1 | 6/2005 | Bajko et al. |
| 2006/0079236 | A1 | 4/2006 | Del Pino et al. |

FOREIGN PATENT DOCUMENTS

EP    1722533 A1 *    11/2006

* cited by examiner

*Primary Examiner*—David Q Nguyen
(74) *Attorney, Agent, or Firm*—Parks IP Law LLC; Jonathan A. Paulis

(57) ABSTRACT

Seamless wireless mobility is described. In one embodiment, a mobility manager can query a subscriber catalog for a current registration status of handset. The mobility manager can then use the registration status to send a first signal to the handset over either a wireless network or an Internet protocol-based network.

19 Claims, 6 Drawing Sheets

SEAMLESS WIRELESS MOBILITY

CROSS REFERENCE TO RELATED APPLICATION

This application is a continuation of U.S. application Ser. No. 11/275,783 entitled "Seamless Wireless Mobility," filed Jan. 27, 2006, now U.S. Pat. No. 7,574,207 which is hereby incorporated by reference in its entirety.

BACKGROUND

Given their portable nature and ease of use, wireless handsets (such as cellular phones) have enjoyed wide proliferation. This is especially the case among users who move around frequently, but wish to stay in contact with their work colleagues, families and other individuals or entities of importance.

Often, however, coverage problems arise when a user attempts to use a handset inside of a building. For example, many electromagnetic signals (such as radio frequencies used by Wi-Fi devices and cellphones) are unable to fully propagate through walls, metalized glass or other common building materials which separate the inside of a building from an outside environment. As a result, the user may experience a degradation of service or may be precluded entirely from sending or receiving information from their handset to an existing outside network.

Additionally, many wireless handset users also have other communication devices, such as "soft phones" using voice over IP (VoIP) protocols, as well as analog phones communicating over POTS (plain old telephone system) lines for both business and personal use. Thus a single user may be associated with several different telephone numbers receive calls over a variety of different transmission mediums.

SUMMARY

This summary is provided to introduce simplified concepts of seamless wireless mobility, which is further described below in the Detailed Description. This summary is not intended to identify essential features of the claimed subject matter, nor is it intended for use in determining the scope of the claimed subject matter. In one embodiment of seamless wireless mobility, a mobility manager can query a subscriber catalog for a current registration status of a handset. The mobility manager can ten use the registration status to send a first signal to the handset over either a wireless network or an Internet protocol-based network.

According to one embodiment, a status of registration of a handset is established by determining if the handset is registered to a wireless network or an access point. This status of registration can be used to send a signal to the handset. For example, if the handset is registered on an access point, the signal can be sent over a network to which the access point is coupled using, for example, Internet protocol (IP). Alternately, if the handset is registered to the wireless network, the signal may be sent to the handset over the wireless network. In another embodiment of seamless wireless mobility, if the handset is registered on the access point, the handset can be rung in response to signals addressed to other phones associated with the access point (such as IP phones).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Environment

Figure 1:
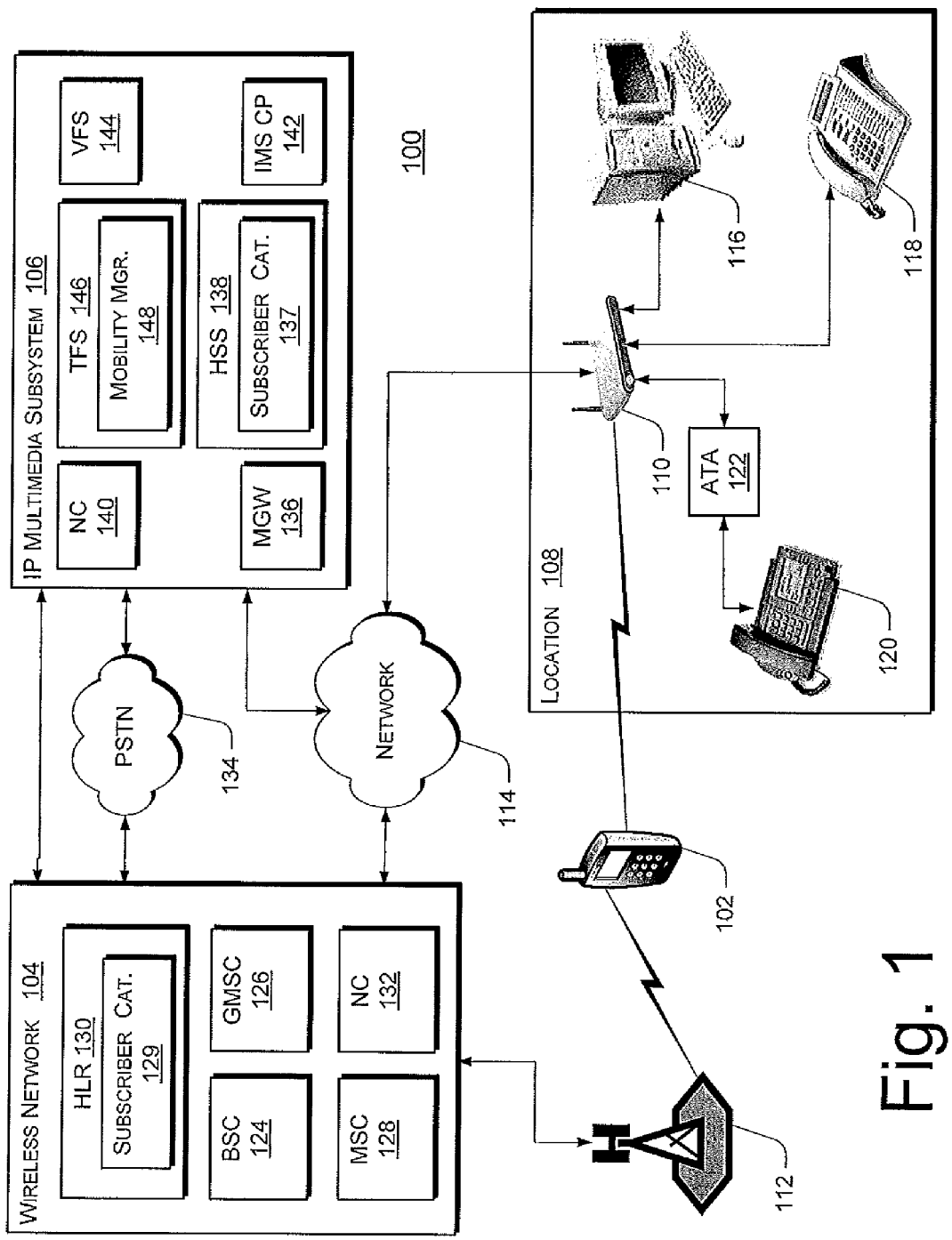
FIG. 1. is a block diagram illustrating an exemplary environment including a handset, a wireless network, an Internet protocol multimedia subsystem, and a location in which an access point may be found.

FIG. 1 shows an exemplary environment 100 in which the techniques described herein can be implemented. Environment 100 includes a wireless handset 102, a wireless network 104, an Internet protocol multimedia subsystem (IMS) 106 and a location 108. In but one possible implementation described herein, the handset 102 is a dual mode cell phone capable of communicating with the wireless network 104 and an access point 110 in location 108. However, the handset 102 could also be any of a variety of other types of computer and computer-like devices having the capability of communicating with (1) wireless network 104 including, for example, a Global System for Mobile Communications (GSM) network or Universal Mobile telecommunications System (UMTS) network, and (2) access point 110 using wired and wireless technologies including, for example, the IEEE 802.11b wireless networking standard (Wi-Fi). Such devices may include a tablet PCT, a personal digital assistant (PDA), or a handheld video gaming device. It will also be understood that a plurality of handsets 102 could be found, and utilized successfully in, environment 100.

According to an exemplary embodiment, a wireless handset, such as handset 102, may have varied functionality allowing a user to perform many different tasks. For example, in addition to sending and receiving voice-based communications, a user may also be able to use handset 102 to run a host of standard computer programs (word processing, spreadsheets, etc.) and games, send and receive emails, browse the Internet, etc.

Internet protocol multimedia subsystem (IMS) 106 can allow for seamless wireless mobility of the handset 102 between the wireless network 104 and the location 108. As the handset 102 moves into an effective communication range of access point 110, IMS 106 can effect a handover of the handset 102 from wireless network 104 to access point 110. As discussed in more detail below, the IMS 106 can do this by collecting and/or observing registration information regarding the handset 102. For example, when the handset is within a range in which the handset 102 can effectively communicate with access point 110, the registration of the handset 102 may be removed from wireless network 104 (and cell tower 112 over which handset 102 may be accessing wireless network 104), and handset 102 can be registered on access point 110.

The IMS 106 can detect this registration status and begin allowing handset 102 to send and receive signals via access point 110. Access point 110 can send and receive these signals over a network 114, which can include an IP-based network, including, e.g., and IP WAN or the Internet. When handset 102 is communicating with access point 110 through wireless technologies, a user may not even be aware that the handoff from wireless network 104 to access point 110 and the network 114 has taken place.

Access point 110 may include any device or architecture allowing handset 102 to send or receive data over network 114. Access point 110 may benefit from a small size—including dimensions less than or equal to those of a WiFi access point. As a result, access point 110 can fit easily and unobtrusively in a building environment. Access point 110 may also be very simple to use. For example, as mentioned above, the small size of access point 110 can made access point 110 easy to install by end users. Moreover, access point 110 may also be able to self-configure itself by examining its environment, noting the presence of competing macro-cells, such as cell tower 112, and other access points 110, and noting the presence of handsets 102.

Moreover, since access point 110 may be able to recognize all of the downlink channels in use around it from other devices, including macro cells, access point 110 may be able to choose an appropriate channel that handset 102 is able to support. Access point 110 may communicate directly with handset 102 and command handset 102 to change itself to an appropriate channel (and power level) to communicate with access point 110, such that a high level of quality of communication between handset 102 and access point 110 can be achieved and maintained.

It will be understood that the elements discussed above with regard to the access point 110 may be implemented by software, hardware or a combination thereof. Moreover, security functions, such as determining ser privilege to enter a cellular carrier's network, or defensive mechanisms against the passing of viruses, may exist in access point 110, wireless network 104 or any point between these elements.

As shown in FIG. 1, access point 110 may be placed in location 108. Location 108 may include any environment in which it may be desirable to use handset 102 to send and/or receive data over a network, such as network 114. This may include a home environment, such as a family room or bedroom. Alternately, location 108 may include a business environment, such as an office, or a common space in proximity of one or more offices. Similarly, location 108 could include a public space, such as a hospital, restaurant or coffee shop offering Wi-Fi access to its customers. In addition, location 108 could be outside of a building, such as in a public park. In yet another possible implementation, location 108 could include underground facilities, and any other locations where reception and transmission of wireless signals to and from a wireless network is problematic. For example, in elevators, where wireless communications with the outside environment are often prone to disruption, access point 110 could be placed in the elevator shaft. In such a configuration the shaft could act as a wave guide, allowing high quality communication between access point 110 and handset(s) 102 traveling up and down the shaft in the elevator(s).

Regardless of where location 108 might be, several different devices can be associated with the access point 110. For example, a computer 116 may access network 114 via access point 110 through wired or wireless means. Additionally, an IP phone 118 could be coupled to access point 110 through wired or wireless means and send and receive data over network 114 via the access point. Similarly, an analog phone 120 could be coupled to access point 110 through an analog terminal adapter 122 and wired or wireless means, enabling analog phone 120 to act like an IP phone. Other devices, which are not shown for the sake of graphic clarity, could also be coupled through wired or wireless means to access point 110, including game consoles, personal digital assistants, tablet PCs, etc. It will also be understood that additional communications devices, such as analog telephones coupled to plain old telephone system (POTS) lines, may be found in location 108 and may be considered associated with access point 110 if so desired by a user.

In operation, when handset 102 is out of range of access point 110—and thus cannot communicate with access point 110 at an acceptable level of quality—handset 102 can behave as a normal cellular phone and communicate through wireless network 104. For example, if handset 102 is within range of cell tower 112, handset 102 can communicate wireless with tower 112, thus accessing wireless network 104. In such an instance, handset 102 will not be registered on access point 110, but will instead be registered on wireless network 104 as communicating through for example, a base station controller (BSC) 124 in wireless network 104. Data being sent and received by handset 102 may be transmitted between BSC 124 and a gateway mobile switching center (GMSC) 126 in wireless network 104, via a mobile switching center (MSC) 128, Additionally, information regarding handset 102, including data indicating on which mobile switching center 128 the handset is registered, may be stored in a subscriber catalog 129, such as might be associated with a home locator register (HLR) 130.

If handset 102 is moved closer to location 108, however, and handset 102 is placed at a distance from access point 110 where handset 102 and access point 110 may communicate through wired or wireless means with an acceptable level of quality, handset 102 may be handed off from cell tower 112 to access point 110. In such an instance, handset 102 may communicate with access point 110 and uplink signals from handset 102 may be received by access point 110 and be transmitted over network 114, to network controller 132 such as an unlicensed mobile access (UMA) network controller. It will be understood that terms 'signals' and 'uplink signals' as used herein may include data and commands sent in analog or digital form. Thus, 'signals' and 'uplink signals' may include text messages, voice transmissions, computer-readable instructions, etc.

Returning to the instant example, transmission of the uplink signals over network 114 may be conducted utilizing the UMA protocol or any other protocol in which the signals may be transmitted via an Internet security protocol (IPSEC) tunnel to network controller 132.

At network controller 132, encoded information received over the IPSEC tunnel is converted into an interface protocol, such as the cellular A interface protocol, and the information may then be transmitted over a coupling to a mobile switching center, such as mobile switching center 128. In addition, network controller 132 may also be able to support multiple devices having ISPEC tunnel compatible clients (such as UMA clients). In this way network controller 132 can distribute commands, instructions and data addresses to several different devices based on identities of the devices as designated by the ISPEC tunnel compatible clients the devices contain.

Once the signals are sent from network controller 132, they may be received in mobile switching center 128, from which the signals may then be communicated, for example, to a public switched telephone network (PSTN) 134, where they may then be transmitted to any network in the world. Alternately, the signals may be transmitted from the mobile switching center 128 to a media gateway (MGW) such MGW 136 in IMS 106, where the signals may then be coupled to a network 114 such as the Internet.

In the other direction, when handset 102 is registered on access point 110, once signals intended for handset 102 are received at mobile switching center 128 from either media gateway 136 or PSTN 134, a reverse path is followed. For example, the signals are transmitted from mobile switching center 128 to network controller 132 where the signals are converted from on interface protocol, such as the cellular A interface protocol, to a protocol in which the signals may be transmitted over IPSEC tunnel to the access point 110 (such as the UMA protocol). Network controller 132 may be able to route the signals to handset 102 through the location and identification of a client (such as an UMA client) in access point 110 with which handset 102 is communicating.

Once the correct access point 110 is located, network controller 132 may transmit the signals over network 114 to access point 110, where the signals may be downlinked from access point 110 to handset 102 using, for example, radio waves, including Wi-Fi frequencies.

Access point 110 may also receive commands and instructions from IMS 106. These commands may be sent to access point 110 from IMS 106 over a wired or wireless connection (not shown for sake of graphic clarity), and/or a network (such as network 114 illustrated in FIG. 1). In addition, information regarding access point 110, and handset 102 may be collected by IMS 106 over the connection, and/or network 114 and stored in a subscriber catalog 137, such as might be associated with home subscription subsystem (HSS) 138. This information can include the registration status of handset 102, including if handset 102 is registered on access point 110 or on a baste station controller such as BSC 124. Additionally, home subscription subsystem 138 can be coupled to home location register 130, and information can be shared between the two. Similarly, home subscription subsystem 138 can sync itself periodically, and/or on command, with home location register 130 to update the information in home subscription subsystem 138 based on the information in home location register 130.

In one implementation, IMS 106 may allow an entity to deduce the geographic location of access point 110 through examination of the channels transmitted from adjacent cell towers which access point 110 is able to sense. In yet other implementations, IMS 106 may be able to shut down access point 110, or allow software updates to be downloaded to access point 110.

By utilizing access point 110, a user of handset 102 may be afforded a dependable, high-quality connection to wireless network 104. In contrast, without access point 110, the user would have to rely on direct communication between handset 102 and an available macro-cell (such as represented by cell tower 112). In such a scenario, deprecation of signal transmission quality or total failure to achieve communication between handset 102 and the macro-cell could result from (1) interference to the propagation of electromagnetic signals posed by the walls, windows and other obstructions placed by location 108 between handset 102 and tower 112; as well as (2) propagation difficulties posed by the distance between tower 112 and handset 102.

Moreover, it will be understood that even though only one access point 110 is illustrated in location 108, a plurality of access point could be employed in various locations throughout location 108. In this manner, seamless, high quality signal transmission between handset 102 and the networks of various cellular and other providers could be ensured in particular areas of location 108, or if desired, throughout the entire area of location 108.

It will be understood that communications between, for example, wireless network 104, and IMS 106, as well as communications between PSTN 134 and IMS 106 may be transmitted via one or more network controllers 140 in IMS 106. Moreover, communications between various elements in IMS 106 may be conducted via an IMS core platform (IMS CP) 142, using technologies such as call state control function and media gateway control function. Also, IMS 106 may include a voicemail feature server (VFS) 144 to accept signals intended for handset 102 when handset 102 is registered on neither wireless network 104 nor access point 108, or when a user does not answer handset 102 when it is rung in response to an incoming signal.

Recognition of a registration of handset 102, and use of the registration status to send signals to handset 102 over either wireless network 104 or network 114 can be made by a telephony feature server (TFS) 146 in IMS 106 on which a mobility manager 148 may reside.

Telephony Feature Server

Figure 2:
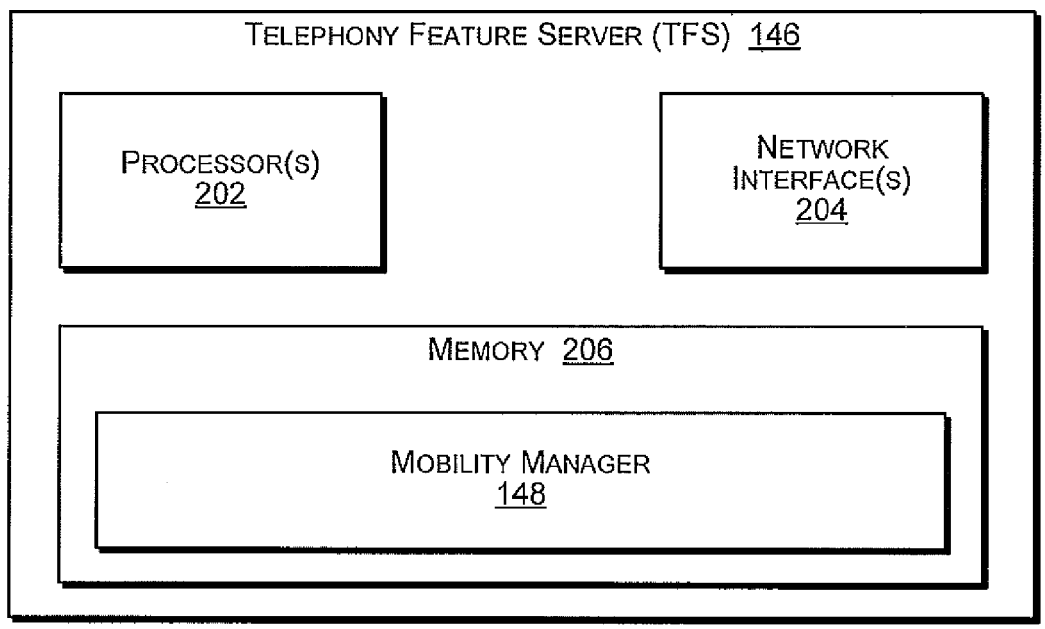
FIG. 2 is a block diagram illustrating an exemplary telephony feature server on which a mobility manager may reside.

FIG. 2 illustrates exemplary functional components of telephony feature server (TFS) 146 which allow TFS 146 to send signals to and from handset 102 via either wireless network 104 or network 114. These components may include one or more processor(s) 202, one or more network interface(s) 204, and a memory 206. Memory 206 can store programs executed on the processor(s) 202 and data generated ruing their execution. Memory 206 can also include various computer-readable storage media, such as volatile media, nonvolatile media, removable media, and non-removable media. It will be understood that volatile memory may include media such as random access memory (RAM), and non volatile memory may include read only memory (ROM). Telephony feature server 146 may also include other removable/non-removable, volatile/non-volatile computer storage media such as a hard disk drive for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-Rom, DVD-Rom, or other optical media. The disk drives and their associated computer-readable media can provide non-volatile storage of computer readable instructions, data structures, program modules, and other data for telephony feature server 146.

In addition to including a hard disk, a removable magnetic disk, and a removable optical disk, as discussed above, memory 206 may also include other types of computer-readable media capable of storing data that is accessible by a computer, such as magnetic cassettes or other magnetic storage devices, flash memory cards, electrically erasable programmable read-only memory (EEPROM), and the like. The hard disk drive, magnetic disk drive, and optical disk drive may each be connected to a system bus by one or more data media interfaces. Alternatively, the hard disk drive, magnetic disk drive 108, and optical disk drive 108 may be connected to the system bus by one or more interfaces.

Any number of programs, program modules, data objects, or other data structures may be stored on the memory 206 including an operating system, one or more application programs, other program modules, and program data.

In this example, memory 206 stores a mobility manager application 148, which when executed on processor(s) 202, allows TFS 146 to determine the registration status of handset 102, and send signals to and from handset 102 over either network 114 or wireless network 104. It will also be understood that the name "mobility manager" has been chosen for the sake of convenience of reference, and not for the sake of limitation. It will also be understood that mobility manager 148 need not necessarily reside in memory 206, and could reside in a memory location coupled to TFS 146. For example, on one implementation, mobility manager 148 could reside outside of TFS 146 on a memory elsewhere in IMS 106. In another implementation, mobility manager 148 could reside on a memory accessible by TFS 146 over network 114. Similarly, it will be understood that in a networked environment, program modules and applications such as a mobility manager 148 depicted and discussed above in conjunction with the telephony feature server 146 or portions thereof, may be stored in a remote storage device. By way of example, mobility manager 148 may reside on a memory device of a remote computer communicatively coupled to IMS 106. For purposes of illustration, application programs and other executable program components such as mobility manager 148 may reside at various times in different storage components of TFS 146 or of a remote computer, and may be executed by one of the at least one processor(s) 202 of the TFS 146, or by processors on the remote computer.

In operation, signals (such as phone calls) being sent to and from handset 102 can trigger IMS 106, to activate TFS 146. For example, once TFS 146 is notified that a signal addressed to handset 102 has been received by PSTN 134, GSMC 126, or MOW 136, mobility manager 148 can query a subscriber catalog 129, 137 such as might be found in home location register 130 and home subscriber subsystem 138, respectively, to determine the registration status of handset 102 (i.e. to see if handset 102 is registered on access point 110 or on wireless network 104). If handset 102 is registered on access point 110, for example, mobility manager 148 and/or TFS 146 can send the signal to handset 102 via a corresponding mobile switching center, network controller 132, network 114 and access point 110.

In one implementation, handset 102 may be rung to indicate the presence of the signal. In another possible implementation, one or more of the phones associated with access point 110 (including IP phone 118 and analog phone 120), as well as one or more analog phones in location 108 connected to POTS lines, can be rung in addition to handset 102 by TFS 146 and/or mobility manager 148 to enable the user to accept the signal at any of the phones.

For example, a normal phone call to handset 102 can result in the ringing of all phones in location 108, including handset 102, enabling the user to conveniently accept the call at the nearest phone to him. Alternately, the user may choose one phone in location 108, and allow another user to choose a different phone in location 108, such that both individuals may interact with the incoming call, and each other, over the chosen phones in location 108. In such a manner, user of handset 102 can easily facilitate an impromptu conference call allowing several users to speak with each other.

In yet another possible implementation, when a call addressed to analog phone 120, IP phone 118, or a regular analog phone in location 108 connected to a POTS line, is received by PSTN 134, GSMC 126 or MGW 136, TFS 146 and/or mobility manager 148 may cause handset 102 to ring in addition to the phone to which the call is addressed (and other phones if desired by user).

In all of these examples mentioned above, the phones which ring in response to a received signal can be preprogrammed into the TFS 140 and/or the mobility manager 148 in any desired configuration. Thus, a signal intended for a teenager's cell phone registered on access point 110 may only result in the teenager's handset being rung, while a signal addressed to a parent's handset registered on access point 110 may result in the parent's handset and phones in, for example, a bedroom and home office to ring.

Also, if in response to the rings no phone is activated, the signal may either activate an answering machine in one or more of the phones 118, 120 in location 108, or the signal may be routed to voicemail feature server 144.

In another possible implementation, if handset 102 is registered on access point 110 and a signal is sent from handset 102, the signal is sent via access point over network 114 to network controller 132. If the signal is addressed to a phone connected to a POTS line, the signal can be routed to PSTN 134 via GMSC 126 and MSC 128 by network controller 132. Alternately, if the signal is addressed to a mobile phone, such a cellular phone, the signal may be routed to a base station controller through which the mobile phone may be reached via a corresponding mobile switching center.

If however, the signal is from a handset registered to an access point, like access point 110, the signal can be sent from controller 132, to IMS 106 via MSC 128 and GMSC 126. The particular access point on which the destination handset is registered can then be found by the TFS 146 and/or mobility manager 148, and the signal can be sent to the destination handset in a manner similar that described above.

As previously described, signals can be voiced communications, such as phone calls, or text based messages such as instant messages. In one possible implementation, a client for instant messaging may reside on handset 102, enabling handset 102 to send and receive instant messages addressed to computer 116 when handset 102 is registered on access point 110. In such a manner, a user may free up computer 116 for other uses while still retaining the ability to communicate via instant messages using handset 102.

When handset 102 is not registered on access point 110, and instead is registered on wireless network 104, a signal intended for handset 102 received by PSTN 134, GSMC 126, or MGW 136 can activate TFS 146 in a similar manner. For example, mobility manager 148 can query a subscriber catalog 129, 137 such as might be found in home location register 130 and home subscriber subsystem 138, respectively, to determine the registration status of handset 102 (i.e. to see if handset 102 is registered on access point 110 or on wireless network 104). When it is determined that handset 102 is not registered on access point 110, mobility manager 148 and/or TFS 146 can send the signal to a proper mobile switching center (MSC 128) such that the signal may be transmitted to handset 102 via a corresponding base station controller (BSC 124) and cell tower 112.

Sending a Signal to a Handset

Figure 3:
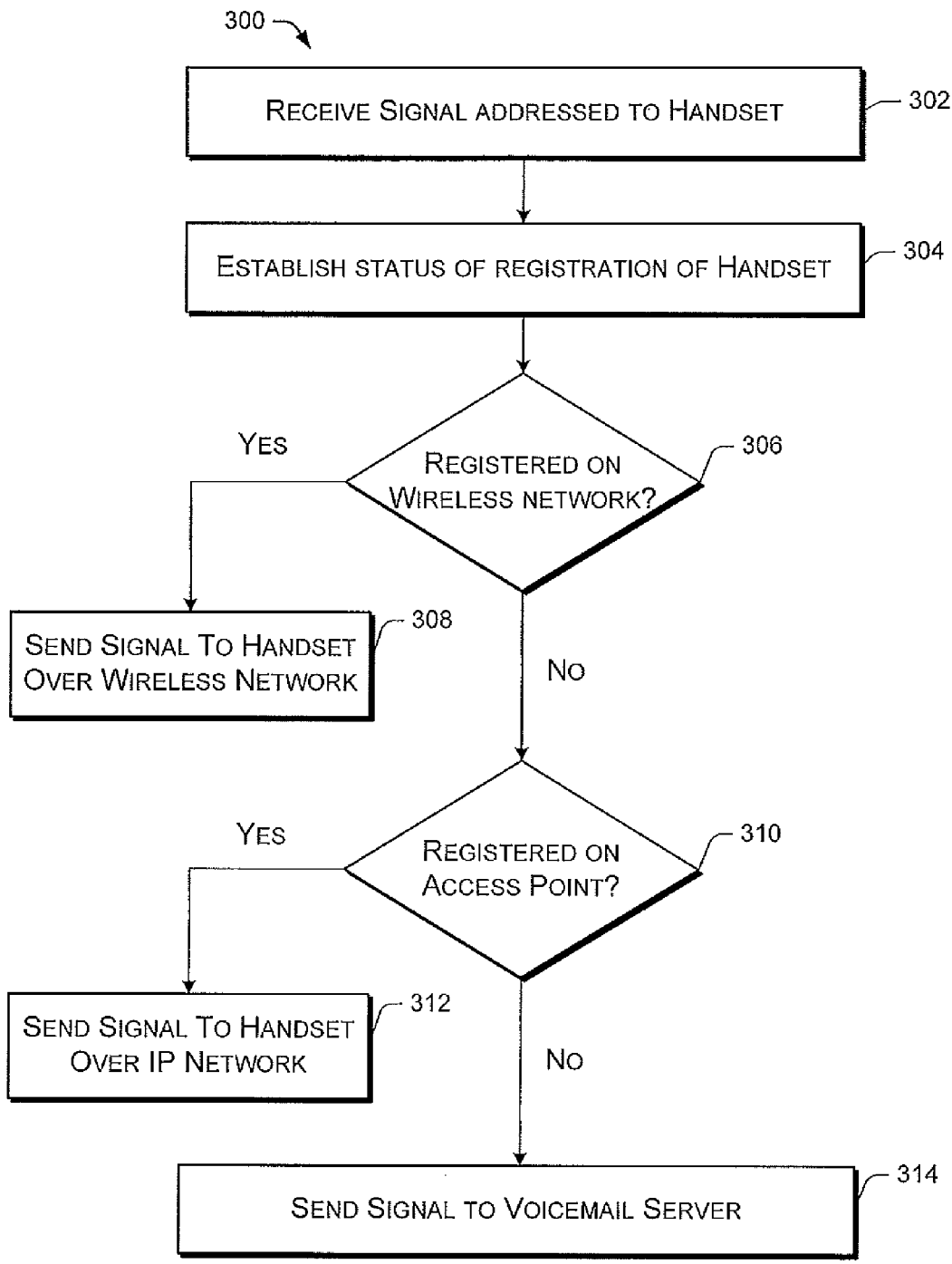
FIG. 3 is a flow diagram illustrating a exemplary nethod of sending a signal to a handset.

FIG. 3 illustrates an exemplary method 300 of sending a signal to a handset. For ease of understanding, the method 300 is delineated as separate steps represented as independent blocks in FIG. 3; however, these separately delineated steps should not be construed as necessarily order dependent in their performance. Moreover, it is also possible that one or more of the provided steps may be omitted. Additionally, for discussion purposes only, the method 300 is described with reference to elements in FIGS. 1-2. However, it is understood that the method 300 may be performed, at least in part, by elements other than those shown in FIGS. 1-2 without departing from the spirit and scope of the subject matter described herein.

At block 302, a signal intended for handset 102 is received. As noted above, the received signal can include text or voice-based information as well as commands and instructions. To facilitate delivery of the signal, the status of registration of handset 102 is established (block 304). In one possible implementation, this may be done by querying a subscriber catalog 129, 137 such as might be found in home location register 130 and home subscriber subsystem 138, respectively. If handset 102 is turned on and communicating, the registration status of handset 102 can provide information as to whether handset 102 is registered on wireless network 104 or access point 110. If it is found that handset 102 is registered to wireless network 104 ('yes' path from block 306) then the signal is sent to handset 102 via wireless network 104 (block 308).

If however, handset 102 is not registered on wireless network 104 ('no' path from block 306), but instead handset 102 is registered on access point 110 ('yes' path from block 310), then the signal can be sent to handset 102 via network 114 and access point 110 (block 312). From access point 110 to handset 102, the signal may be sent using a radio technology, including Wi-Fi technology.

Alternately, if handset 102 is not registered on access point 110 ('no' path from block 310), the signal can be sent to a voicemail server such as voicemail feature server 144 (block 314).

It will also be understood that some of the above mentioned blocks may be combined. For example blocks 306 and 310 may be combined into one decision block. In such a decision block, if handset 102 is found to be registered to wireless network 104, the signal can be sent to handset 102 via wireless network 104. Conversely, if handset 102 is found to be registered on access point 110, then the signal can be sent to handset 102 via network 114 and access point 110. If, however, handset 102 is found to be registered on neither wireless network 104 nor access point 110, the signal can be sent to a voicemail server.

Method of Activating Multiple Phones

Figure 4:
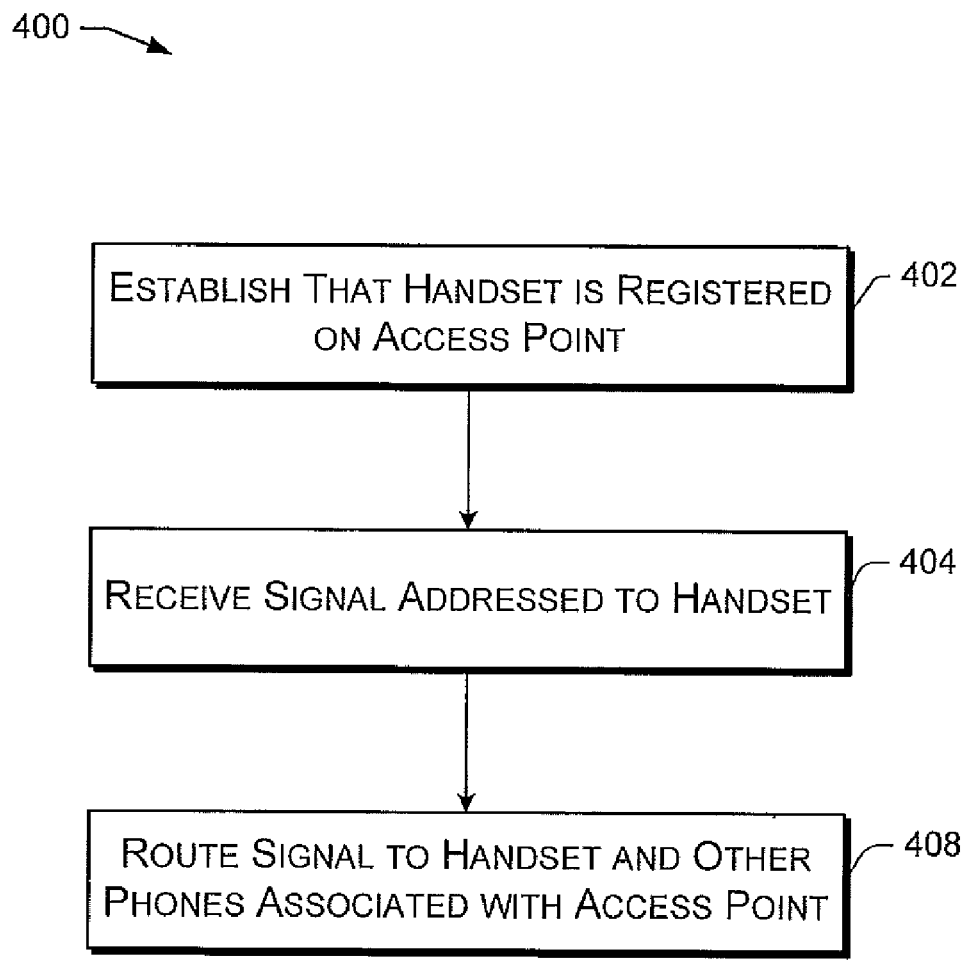
FIG. 4 is a flow diagram illustrating a exemplary method of sending a signal to a handset and at least one other phone when the handset is registered on an access point.

FIG. 4 illustrates an exemplary method 400 of activating multiple phones in response to a signal intended for a handset registered on an access point 110. For ease of understanding, the method 400 is delineated as separate steps represented as independent blocks in FIG. 4; however, these separately delineated steps should not be construed as necessarily order dependent in their performance. Moreover it is also possible that one or more of the provided steps may be omitted. Additionally, for discussion purposes, the method 400 is described with reference to elements in FIGS. 1-2. However, it is understood that the method 400 may be performed, at least in part, by elements other than those shown in FIGS. 1-2 without departing from the spirit and scope of the subject matter described herein.

In one exemplary implementation, the registration status of handset is viewed and it is determined that handset 102 is registered on access point 110 (block 402). A received signal intended for handset 102 (block 404) can then be routed to handset 102 using the registration status of handset 102. In addition to routing the signal to handset 102, the signal may also be routed to all other phones associated with the access point 110 on which handset 102 is registered (block 404) thus activating these additional phones. In the instance that the received signal is a phone call, handset 102, and one or more phones associated with access point 110, for example, IP phone 118 and analog phone 120, may be rung. Additionally, any analog phones connected to POTS lines which are in the proximity of access point 110 may be rung. In this matter a user of handset 102 may choose to receive the signal on handset 102 or any of the other phones which are rung in response to the signal. In other possible implementations, the signal may include text-based information and/or commands and instructions. Moreover, a user may preset just which phones are rung in response to the signal intended for handset 102 according to the user's preferences and/or needs.

Method of Activating Handset when Handset Registered on Access Point

Figure 5:
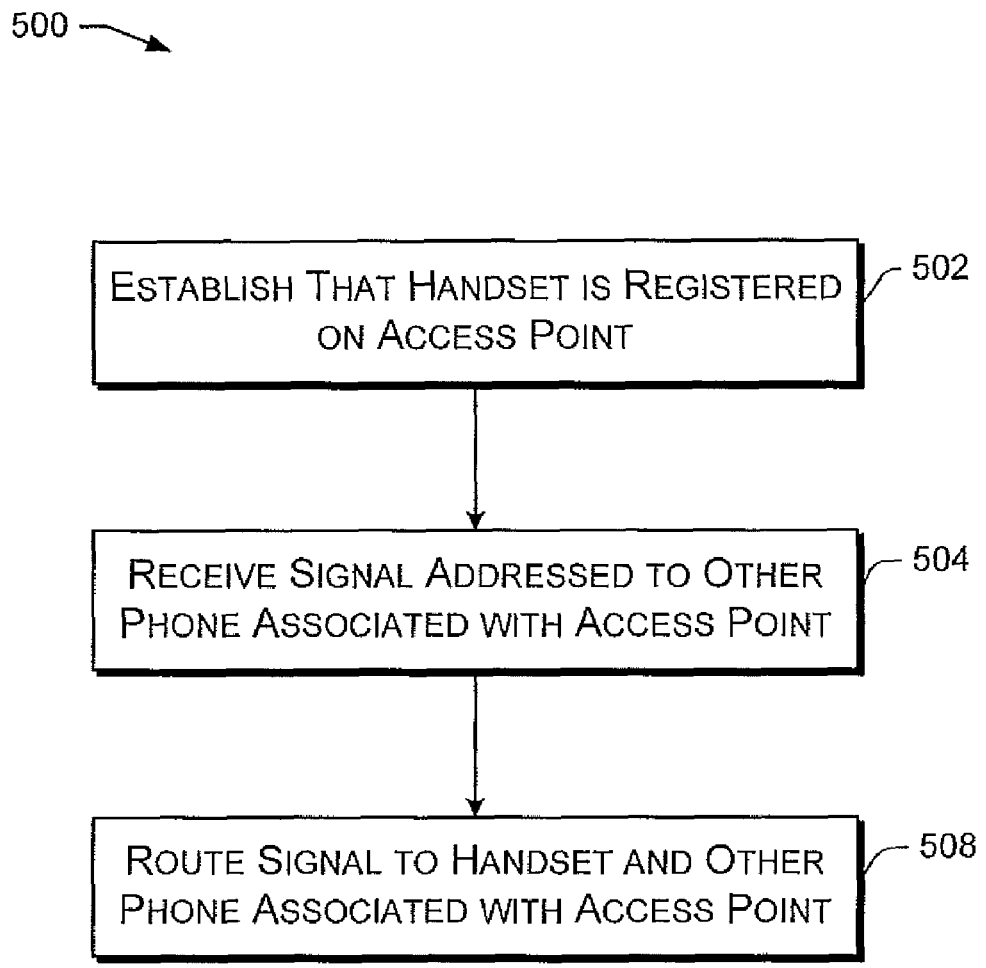
FIG. 5 is a flow diagram illustrating another exemplary method of sending a signal to a handset and at least one other phone when the handset is registered on an access point.

FIG. 5 illustrates another exemplary method 500 of activating multiple phones when handset 102 is registered on access point 110. For ease of understanding, the method 500 is delineated as separate steps represented as independent blocks in FIG. 5; however, these separately delineated steps should not be construed as necessarily order dependent in their performance. Moreover, it is also possible that one or more of the provided steps may be omitted. Additionally, for discussion purposes, the method 500 is described with reference to elements in FIGS. 1-2. However, it is understood that the method 500 may be performed, at least in part, by elements other than those shown in FIGS. 1-2 without departing from the spirit and scope of the subject matter described herein.

In one exemplary implementation, the registration status of handset is viewed and it is determined that handset 102 is registered on access point 110 (block 502). If a signal is received with is intended for a phone associated with access point 110, such as, for example, IP phone 118 or analog phone 120 (block 504), the signal can be routed to the intended phone as well as handset 102 and any other desired phones associated with access point, including analog phones in the vicinity of access point 110 which are coupled to POTS lines (block 508). In the instance that the received signal is a phone call, handset 102, the intended phone, and one or more of the remaining phones associated with the access point 110 may be rung. In this manner a user of handset 102 may choose to receive the signal on handset 102, the intended phone, or any of the other phones which are rung in response to the signal. In other possible implementations, the signal may include text-based information and/or commands and instructions. Moreover, just which phones are rung in response to the signal may be preset according to the user's preferences and/or needs.

Sending a Signal from a Handset

Figure 6:
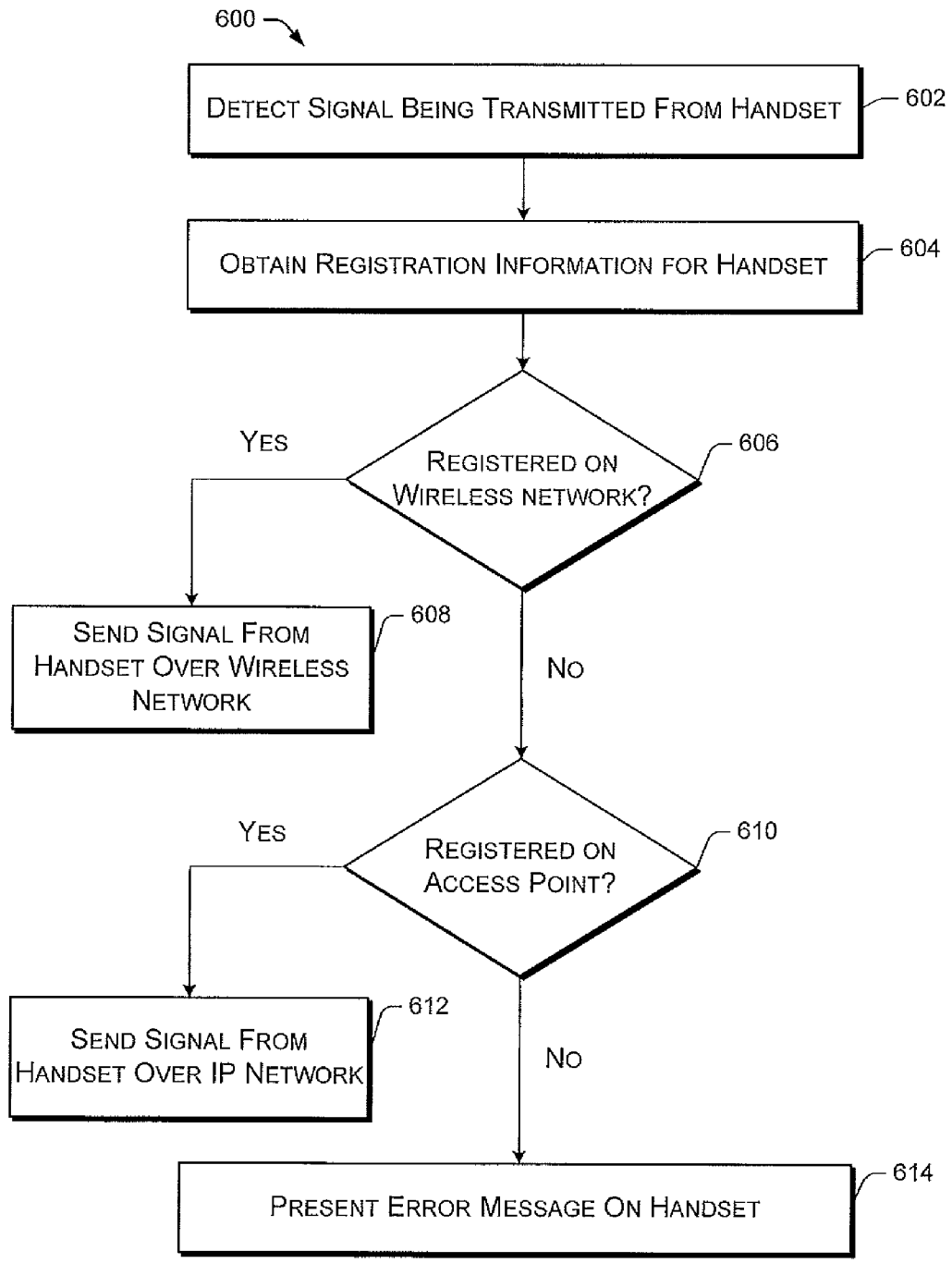
FIG. 6 is a flow diagram illustrating an exemplary method of sending a signal from a handset.

FIG. 6 illustrates an exemplary method 600 of sending a signal from a handset. For ease of understanding, the method 600 is delineated as separate steps represented as independent blocks if FIG. 6; however, these separately delineated steps should be construed as necessarily order dependent in their performance. Moreover, it is also possible that one or more of the provided steps may be omitted. Additionally, for discussion purposes, the method 600 is described with reference to elements in FIGS. 1-2. However it is understood that the method 600 may be performed, at least in party, by elements other than those shown in FIGS. 1-2 without departing from the spirit and scope of the subject matter described herein.

At block 602, a signal being transmitted from handset 102 is detected. As noted above, the transmitted signal can include text or voice-based information as well as commands and instructions. To facilitate delivery of the signal, the status of registration of handset 102 is established (block 604). In one possible implementation, this may be done by querying a subscriber catalog 129, 137 such as might be found in home location register 130 and home subscriber subsystem 138, respectively. If handset 102 is turned on and communicating, the registration status of handset 102 can provide information as to whether handset 102 is registered on wireless network 104 or access point 110.

If is found that handset 102 is registered to wireless network 104 ('yes' path from block 606) then the signal is sent from handset 102 to wireless network 104 (block 608).

If, however, handset 102 is not registered on wireless network 104 ('no' path from block 606), but instead handset 102 is registered on access point 110 ('yes' path from block 610), then the signal can be sent from handset 102 via network 114 and access point 110 ('yes' path from block 610). From handset 102 to access point 110, the signal may be sent using a radio technology, including Wi-Fi technology.

Alternately, if handset 102 is not registered on access point 110 ('no' path from block 610), an error message may be displayed on handset 102 telling the user that the signal cannot be sent (block 614).

As noted above, some of the above mentioned blocks may be omitted. For example, in one exemplary implementation block 604 may be omitted, and instead once an attempt is made to transmit a signal from handset 102, whichever of access point 110 or wireless network 104 handset 102 is registered on may automatically send the signal over it's corresponding network (i.e. network 114 or wireless network 104) or print an error message as shown in blocks 606-614.

It will also be understood that some of the above-mention blocks may be combined. For example, blocks 606 and 610 may be combined into one decision block. In such a decision block, if handset 102 is found to be registered on wireless network 104, the signal can be sent from handset 102 to wireless network 104. Conversely, if handset 102 is found to be registered on access point 110, then the signal can be sent from handset 102 via network 114 and access point 110. If however, handset 102 if found to be registered on neither wireless network 104 nor access point 110, the signal cannot be sent, and an error message can be presented to the user of handset 102.

CONCLUSION

Although exemplary embodiments have been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A method comprising:
  a wireless access point receiving a request for a registration status of a handset from a mobility manager, the handset being registered with the wireless access point;
  the wireless access point providing the requested registration status to the mobility manager, the registration status indicating that the handset is registered with the wireless access point;
  the wireless access point receiving a first signal from the mobility manager, the first signal being addressed to the handset;
  the wireless access point routing the first signal to the handset;
  the wireless access point receiving a second signal from the mobility manager, the second signal being addressed to a device other than the handset, wherein the device is also registered with the wireless access point;
  the wireless access point receiving one or more instant messages from the mobility manager, the instant messages being addressed to a computer registered with the wireless access point; and
  the wireless access point routing the one or more instant message to the handset.

2. The method of claim 1 further comprising the wireless access point routing the first signal to the device.

3. The method of claim 2, wherein the wireless access point routing the first signal to the device comprises routing the first signal to the device by way of a plain old telephone system (POTS) line.

4. The method of claim 1, wherein in the wireless access point receiving the second signal from the mobility manager, and the second signal being addressed to a device other than the handset, the device is one of a second handset, an IP phone, an analog phone, a POTS phone, a game console, a personal digital assistant, and a second computer.

5. The method of claim 1, wherein the wireless access point providing the requested registration status to the mobility manager comprises the wireless access point providing the requested registration status to the mobility manager for storage in a home location register (HLR).

6. The method of claim 1, wherein the wireless access point providing the requested registration status to the mobility manager comprises the wireless access point providing the requested registration status to the mobility manager for storage in a home subscription subsystem (HSS).

7. The method of claim 1, wherein all communications between the wireless access point and the mobility manager are routed through an IP wide area network (IP WAN).

8. The method of claim 1, wherein all communications between the wireless access point and the mobility manager are routed through the Internet.

9. The method of claim 1, wherein the mobility manager is located in an IP multimedia subsystem (IMS) network.

10. A computer-readable medium of a wireless access point, the computer-readable medium comprising computer-executable instructions that, when executed by a processor, perform the steps of a method comprising:
  receiving a request for a registration status of a handset from a mobility manager, the handset being registered with the wireless access point;
  providing the requested registration status to the mobility manager, the registration status indicating that the handset is registered with the wireless access point;
  receiving a first signal from the mobility manager, the first signal being addressed to the handset;
  routing the first signal to the handset;
  receiving a second signal from the mobility manager, the second signal being addressed to a device other than the handset, wherein the device is also registered with the wireless access point;
  receiving one or more instant messages from the mobility manager, the instant messages being addressed to a computer registered with the wireless access point; and
  routing the one or more instant messages to the handset.

11. The computer-readable medium of claim 10 further comprising computer-executable instructions that, when executed by the processor, perform the additional step of routing the first signal to the device.

12. The computer-readable medium of claim 10, wherein the computer-executable instructions that, when executed by the processor, perform the step of receiving the second signal from the mobility manager, the second signal being addressed to the device other than the handset comprises receiving the second signal from the mobility manager, the second signal being addressed to one of a second handset, an IP phone, an analog phone, a POTS phone, a game console, a personal digital assistant, and a second computer.

13. The computer-readable medium of claim 10, wherein providing the requested registration status to the mobility manager comprises providing the requested registration status to the mobility manager for storage in a home location register (HLR).

14. The computer-readable medium of claim 10, wherein providing the requested registration status to the mobility manager comprises the wireless access point providing the requested registration status to the mobility manager for storage in a home subscription subsystem (HSS).

15. A wireless access point comprising:
- a transceiver configured to transmit and receive signals to and from a mobility manager operating in a wireless network external to an Internet protocol (IP) network in which the wireless access point operates, and route signals received from the mobility manager to a handset registered with the wireless access point;
- a processor in communication with the transceiver;
- a memory in communication with the processor, the memory comprising instructions that, when executed by the processor, cause the processor to:
  - receive a request for a registration status of a handset from the mobility manager to provide a registration status of the handset;
  - transmit the requested registration status to the mobility manager, the registration status indicating that the handset is registered with the wireless access point;
  - receive a first signal from the mobility manager, the first signal being addressed to the handset;
  - route the first signal to the handset;
  - receive a second signal from the mobility manager, the second signal being addressed to a device other than the handset, wherein the device is also registered with the wireless access point;
  - route the second signal to the handset;
  - receive one or more instant messages from the mobility manager, the instant messages being addressed to a computer registered with the wireless access point; and
  - route the one or more instant messages to the handset.

16. The wireless access point of claim 15, wherein the memory further comprises instructions that, when executed by the processor, cause the processor to route the first signal to the device.

17. The wireless access point of claim 15, wherein the instructions, when executed by the computer, cause the processor to route and receive all communications between the wireless access point and the mobility manager through an IP wide area network (IP WAN).

18. The wireless access point of claim 15, wherein the instructions, when executed by the computer, cause the processor to route and receive all communications between the wireless access point and the mobility manager through the Internet.

19. The wireless access point of claim 15, wherein the mobility manager is located in an IP multimedia subsystem (IMS) network.

* * * * *